US012665335B2

(12) United States Patent
Lin et al.

(10) Patent No.: US 12,665,335 B2
(45) Date of Patent: Jun. 23, 2026

(54) PDU POWER DISTRIBUTION APPARATUS

(71) Applicant: Beijing TOP Intelligent Co., Ltd., Beijing (CN)

(72) Inventors: Haiqing Lin, Beijing (CN); Qiang Yu, Beijing (CN); Yue Zhang, Beijing (CN)

(73) Assignee: Beijing TOP Intelligent Co., Ltd., Beijing (CN)

( * ) Notice: Subject to any disclaimer, the term of this patent is extended or adjusted under 35 U.S.C. 154(b) by 350 days.

(21) Appl. No.: 18/420,988

(22) Filed: Jan. 24, 2024

(65) Prior Publication Data

US 2024/0186737 A1 Jun. 6, 2024

Related U.S. Application Data

(63) Continuation of application No. PCT/CN2022/110248, filed on Aug. 4, 2022.

(30) Foreign Application Priority Data

Aug. 9, 2021 (CN) ......................... 202110906304.4

(51) Int. Cl.
*H01R 13/11* (2006.01)
*H01R 13/17* (2006.01)
(Continued)

(52) U.S. Cl.
CPC ........... *H01R 13/113* (2013.01); *H01R 13/17* (2013.01); *H01R 13/502* (2013.01); *H01R 31/06* (2013.01); *H01R 2103/00* (2013.01)

(58) Field of Classification Search
CPC .... H01R 13/113; H01R 13/17; H01R 13/502; H01R 31/06; H01R 2103/00;
(Continued)

(56) References Cited

U.S. PATENT DOCUMENTS 7,374,425 B1 * 5/2008 Kuo ..................... H01R 25/003 439/31
9,450,325 B1 * 9/2016 Lai ..................... H01R 13/4534

FOREIGN PATENT DOCUMENTS

CN 201797109 U 4/2011
CN 103887634 A 6/2014
(Continued)

OTHER PUBLICATIONS

International Search Report cited in PCT/CN2022/110248, mailed Oct. 13, 2022, 9 pages.

*Primary Examiner* — Seung H Lee
(74) *Attorney, Agent, or Firm* — Cooper Legal Group, LLC

(57) ABSTRACT

The present application relates to a PDU power distribution apparatus, comprising a housing, the housing is provided with a conductor assembly facing a bottom of the housing, a fixing element is provided between the conductor assembly and the housing for fixing the conductor assembly, a protecting seat is provided inside the housing for protecting the conductor assembly, and the protecting seat is provided with a through hole for inserting and connecting a power adapter, a pre-installed seat is provided inside the housing for installing the power adapter, and the pre-installed seat is located on a side of the protecting seat departing from the conductor assembly, the pre-installed seat is provided with a socket for inserting and connecting the power adapter on a side facing the conductor assembly, and the pre-installed seat is connected to the housing.

10 Claims, 7 Drawing Sheets

(51) Int. Cl.

| | |
|---|---|
| ***H01R 13/502*** | (2006.01) |
| ***H01R 31/06*** | (2006.01) |
| *H01R 103/00* | (2006.01) |

(58) Field of Classification Search

CPC H01R 13/4534; H01R 25/003; H01R 13/506; H01R 13/02; H01R 13/04; H01R 13/10; H01R 13/40; H01R 13/44; H01R 13/447; H01R 13/631; H01R 13/639; H01R 24/005; H01R 25/006; H05K 7/1492

See application file for complete search history.

(56) References Cited

FOREIGN PATENT DOCUMENTS

| | | | | | |
|---|---|---|---|---|---|
| CN | 106099515 | A | | 11/2016 | |
| CN | 207624979 | U | * | 7/2018 | |
| CN | 111834799 | A | * | 10/2020 | ........... H01R 13/518 |
| CN | 112042284 | A | | 12/2020 | |
| CN | 113363746 | A | | 9/2021 | |

* cited by examiner

PDU POWER DISTRIBUTION APPARATUS

CROSS-REFERENCE TO RELATED APPLICATION

This application is a continuation of PCT application No. PCT/CN2022/110248, filed on Aug. 4, 2022, which claims the priority and benefit of Chinese patent application No. 202110906304.4, filed on Aug. 9, 2021. The entireties of PCT application No. PCT/CN2022/110248 and Chinese patent application No. 202110906304.4 are hereby incorporated by reference herein and made a part of this specification.

TECHNICAL FIELD

The present application generally relates to a technical field of power distribution apparatus, and in particular, to a PDU power distribution apparatus.

BACKGROUND ART

Power Distribution Unit (PDU), also known as a power distribution socket for cabinets, is a power distribution manager with power distribution and management functions, the PDU is a product designed specifically to provide power distribution for electrical equipment installed in cabinets, with an increasing complexity and use of electrical equipment, higher requirements are placed on a rated power that the PDU can provide for electrical equipment, being able to provide greater current output becomes a trend.

At present, there are two main ways for an internal conductive connection of the PDU, one is by wire welding, and another is by fixing a copper strip/bar, for the PDU with larger power supply and power acquisition, the copper strip/bar is usually fixed as a conductive method, the socket of the PDU fixed with the copper strip/bar as the conductive method usually penetrates through along a length direction of the copper strip/bar, so that power can be acquired throughout an entire length direction of the PDU.

Regarding relevant technologies mentioned above, an inventor believes that the conductive method of fixing the copper strip/bar usually has a larger socket, which causes a risk of steel rulers, coins, and other items falling into the socket, and a plug is prone to tipping due to not fixing the plug in the length direction of the PDU, resulting in lower safety.

At the same time, in prior art, a position of the socket is not fixed, which causes inconvenience to a uniform distribution and numbering management of the socket.

SUMMARY

In order to improve a safety of using PDU, the present application provides a PDU power distribution apparatus.

The PDU power distribution apparatus provided in the present application adopts the following technical solution:

a PDU power distribution apparatus, comprising: a housing, wherein a conductor assembly is provided close to a bottom of the housing, a fixing element is provided between the conductor assembly and the housing for fixing the conductor assembly, a protecting seat is provided inside the housing for protecting the conductor assembly, the protecting seat is provided with a through hole for inserting a power adapter, a pre-installed seat is provided inside the housing for installing the power adapter, the pre-installed seat is located on a side of the protecting seat departing from the conductor assembly, a socket is provided on a side of the pre-installed seat facing the conductor assembly for plugging the power adapter, and the pre-installed seat is connected to the housing.

By adopting the above technical solution, installing the fixing element, the conductor assembly, the protecting seat and the pre-installed seat together sequentially, then sliding and inserting them into the housing, closing an end of the housing to complete an installation of the PDU, when inserting the power adapter into the PDU for acquiring the power, directly inserting the power adapter into the pre-installed seat, and inserting the power adapter from a position of the socket into the housing to abut against the conductor assembly, thus completing the power acquisition, the pre-installed seat limits the power adapter, enabling the power adapter to be stably inserted into the pre-installed seat, while the pre-installed seat blocks an exposed part of the conductor assembly, allowing the conductor assembly to only expose at the position of the socket, greatly reducing a possibility of items such as steel rulers and coins easily falling into the socket, in addition, the protecting seat protects the conductor assembly, so that the through hole of the protecting seat will only open when the power adapter is inserted into the protecting seat, thereby further improving a safety of using PDU.

In an aspect, the protecting seat is in plug-in connection with the fixing element along an insertion direction of the power adapter, and the protecting seat is in plug-in connection with the pre-installed seat along the insertion direction of the power adapter.

By adopting the above technical solution, a relative position between the fixing element, the protecting seat and the pre-installed seat is stable, and the conductor assembly is stable and fixed by the fixing element, so that when the power adapter is inserted from the socket of the pre-installed seat, it can be accurately inserted into its corresponding conductor assembly position.

In an aspect, the protecting seat comprises a seat body, a stopper, and a protecting spring, wherein the stopper is located on a side of the seat body departing from the conductor assembly, a through hole is provided on the seat body, the protecting spring is connected between the stopper and the seat body, a deformation direction of the protecting spring is parallel to a length direction of the housing, the stopper is provided with an opening hole directly facing the through hole, the stopper is fixedly connected to an inclined block, the inclined block is located at an end in the opening hole close to the protecting spring, a surface of the inclined block departing from the conductor assembly gradually approaches the conductor assembly along a direction departing from the protecting spring, and when the protecting spring is in a natural state, the stopper and the inclined block just block the through hole.

By adopting the above technical solution, when the power adapter is inserted from the socket into a position of the protecting seat, the power adapter first abuts against the inclined block, as the power adapter is inserted, the inclined block is pushed by the power adapter and drives the stopper to move, the stopper gradually compresses the protecting spring, so that the stopper and the inclined block gradually open the through hole, allowing a plug part of the power adapter to be inserted into the through hole, achieving a blocking effect on the through hole, so that when the power is not acquired from the power adapter, the through hole can be blocked, opening the through hole when inserting the power adapter; after inserting the plug part of the power adapter into the through hole, the protecting spring is in a compressed state, the protecting spring pushes the stopper and the inclined block to abut against the plug part of the power adapter, therefore, it also plays a fixed role in the plug part of the power adapter, allowing the plug part of the power adapter to be stably connected to the PDU.

In an aspect, a limiting slot is provided on a side of the stopper facing the protecting spring, the stopper is fixedly connected to a limiting column, wherein the limiting column is located at a bottom of the limiting slot, a length direction of the limiting column is parallel to the deformation direction of the protecting spring, an end of the protecting spring is located inside the limiting slot, and the protecting spring is sleeved on the limiting column.

By adopting the above technical solution, the limiting slot increases a length of the protecting spring between the seat body and the stopper, reducing a deformation of the protecting spring per unit length, thereby improving a service life of the protecting spring, at the same time, the limiting column limits the protecting spring, ensuring a stability of its position, allowing the stopper to stably reset and blocking the through hole, further reducing the possibility of items such as steel rulers and coins falling from the socket into the through hole and abutting against the conductor assembly.

In an aspect, a snap-in slot is provided on the side of the seat body departing from the conductor assembly, a snap-fit column matched with the snap-in slot is fixedly connected to a side of the pre-installed seat facing the conductor assembly, an inner wall of the seat body is fixedly connected to a guiding block, wherein the guiding block starts from an inner wall of the snap-in slot and gradually approaches a center of the snap-in slot towards the conductor assembly, a side of the snap-fit column opposite to the guiding block is fixedly connected with a snap-fit block, the snap-fit block starts from a bottom of the snap-fit column and gradually departs away from the conductor assembly in a direction departing from the snap-fit column, and an end of the snap-fit block departing from the conductor assembly abuts against an end of the guiding block close to the conductor assembly.

By adopting the above technical solution, after inserting the snap-fit column into the snap-in slot, the snap-in slot limits a position of the snap-fit column, so that a relative position between the seat body and the pre-installed seat is relatively stable, that is, the socket and the through hole can be stably aligned, so that the power adapter can be stably inserted into the through hole from the socket; as the snap-fit column is gradually inserted, the snap-fit block is gradually guided by the guiding block departing from a side of the seat body which is connected to the guiding block, until the snap-fit block is located on a side of the guiding block facing the conductor assembly, at this time, the end of the snap-fit block departing from the conductor assembly abuts against the end of the guiding block facing the conductor assembly, making the seat body and the pre-installed seat more stable.

In an aspect, the conductor assembly comprises two copper strips and a connecting part that is connected between the two copper strips, the copper strips are parallel to the insertion direction of the power adapter, and the power adapter is configured to acquire power from the conductor assembly, the two copper strips abut against each other, the conductor assembly is provided with an inserting part, the connecting part and the inserting part are arranged at intervals, the inserting part comprises at least two elastic slots and a snap-in hole, the snap-in hole is located between two elastic slots; at the at least two elastic slots, the two copper strips protrude departing from each other; and a distance between the two copper strips at the snap-in hole is less than a maximum distance between the two copper strips at the at least two elastic slots.

By adopting the above technical solution, the plug part of the power adapter is inserted into the snap-in hole, and the plug part of the power adapter further expands the snap-in hole, at the same time, the elastic slots on both sides of the snap-in hole deform, making it easier for the plug part of the power adapter to be inserted into the snap-in hole; the connecting part limits an end of the inserting part facing the pre-installed seat, so that a top of the elastic slot is connected by the connecting part, which is not prone to excessive deformation, even permanent deformation, which is conducive to improve a service life of the conductor assembly; at the same time, a providing of the conductor assembly formed by two copper strips allows each metal inserting sheet of the plug part of the power adapter can abut against the two copper strips, thereby increasing a contact area between the copper strip and the plug part of the power adapter, reducing a temperature rise of a contact point, and adapting to needs of higher power supply and power acquisition.

In an aspect, a mounting slot matched with the conductor assembly is provided on a side of the fixing element facing the protecting seat, the mounting slot comprises a fixing slot and an accommodating slot, the fixing slot and the accommodating slot are sequentially connected; the fixing slot expands from a middle part of the fixing slot, a width of the fixing slot is gradually reduced when approaching an end part of the fixing slot; a width of the accommodating slot is uniform, which is consistent with a width of an end of the fixing slot.

By adopting the above technical solution, the conductor assembly is located exactly in the accommodating slot where the copper strips abut against each other, and the inserting part is just clamped in the fixing slot, the two ends of the fixing slot can have a large contact area with the copper strip at a position of the elastic slot, so that the fixing slot can have a good fixing effect on the inserting part and prevent the conductor assembly from moving along a length direction of the mounting slot, ensuring a stability of a relative position between the fixing part and the conductor assembly, which is further conducive to ensure stable alignment between the snap-in hole, the through hole, and the socket.

In an aspect, the accommodating slot penetrates through the fixing element along the insertion direction of the power adapter.

By adopting the above technical solution, the accommodating slot enables the conductor assembly to form a certain space below the fixing element to dissipate heat, which is conducive to further reduce the temperature rise at the contact point and adapt to the needs of higher power supply and power acquisition.

In an aspect, the fixing element comprises a plurality of fixed strips that are sequentially inserted along a length direction of the conductor assembly, a first end of the fixed strip is fixedly connected to a connecting block along the length direction of the conductor assembly, and the connecting block is located on both sides of the fixed strip departing from a center of the fixed strip, a side of the connecting block facing the center of the fixed strip is fixedly connected to a convex block, and a second end of the fixed strip is provided with a connecting slot that is matched with the convex block.

By adopting the above technical solution, during a process of aligning and inserting adjacent fixed strips, the connecting block and the convex block gradually snap into the connecting slot, so that the adjacent fixed strips will not detach relative to each other, which is convenient for the fixed strips to be installed; at the same time, for housings of different lengths, different numbers of the fixed strips can be connected, without a need to separately mold a corresponding size of the fixing element for the housings of different specifications and lengths, improving an applicability of the fixing element to a plurality of housings of different sizes.

In summary, the present application includes at least one of the following beneficial technical effects:

1. by providing the protecting seat and the pre-installed seats the pre-installed seat blocks the exposed part of the conductor assembly, allowing the conductor assembly to only expose at the position of the socket, greatly reducing the possibility items such as the steel rulers and the coins falling from the socket into the through hole and abutting against the conductor assembly, in addition, the protecting seat protects the conductor assembly, so that the position of the through hole will only open when the power adapter is inserted into the through hole, thereby further improving the safety of using PDU;
2. by providing the protecting seat structure, so that when the power is not acquired from the power adapter, the through hole can be blocked, opening the through hole when inserting the power adapter; after inserting the plug part of the power adapter into the through hole, the protecting spring pushes the stopper and the inclined block to abut against the plug part of the power adapter, therefore, allowing the plug part of the power adapter to be stably connected to the PDU;
3. by providing the conductor assembly, the plug part of the power adapter is prone to be inserted into the snap-in hole, so that the top of the elastic slot is connected by the connecting part, which is less prone to excessive deformation, which is conducive to improve the service life of the conductor assembly; increasing the contact area between the copper strip and the plug part of the power adapter, reducing the temperature rise of the contact point, and adapting to needs of higher power supply and power acquisition.

List of reference signs: 1. housing; 11. guiding slot; 12. supporting strip; 2. power adapter; 21. snap-fit part; 22. fixed block; 3. conductor assembly; 31. copper strip; 311. guiding part; 32. connecting part; 4. inserting part; 41. elastic slot; 42. snap-in hole; 5. fixed strip; 51. mounting slot; 511. fixing slot; 512. accommodating slot; 52. positioning rod; 53. connecting slot; 54. positioning column; 55. connecting block; 551. convex block; 6. protecting seat; 61. seat body; 611. through hole; 612. snap-in slot; 613. guiding block; 614. stable slot; 615. mounting snap-in slot; 62. stopper; 621. opening hole; 622. inclined block; 623. limiting slot; 624. limiting column; 63. protecting spring; 7. pre-installed seat; 71. socket; 72. snap-fit column; 721. snap-fit block; 73. guiding strip; 74. fixing hole.

DETAILED DESCRIPTION

The present application will be further described in detail below with reference to FIGS. 1-7.

Figure 1:
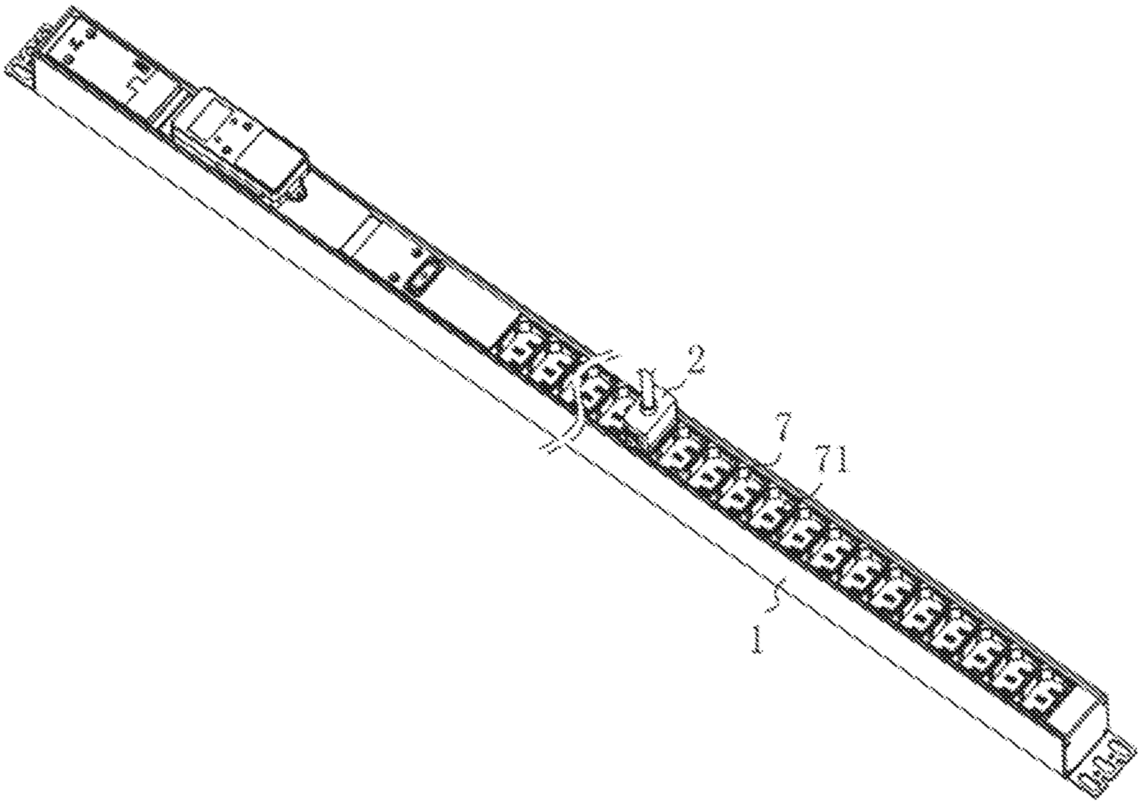
FIG. 1 is a schematic overall structure view of the specific embodiment.
Figure 2:
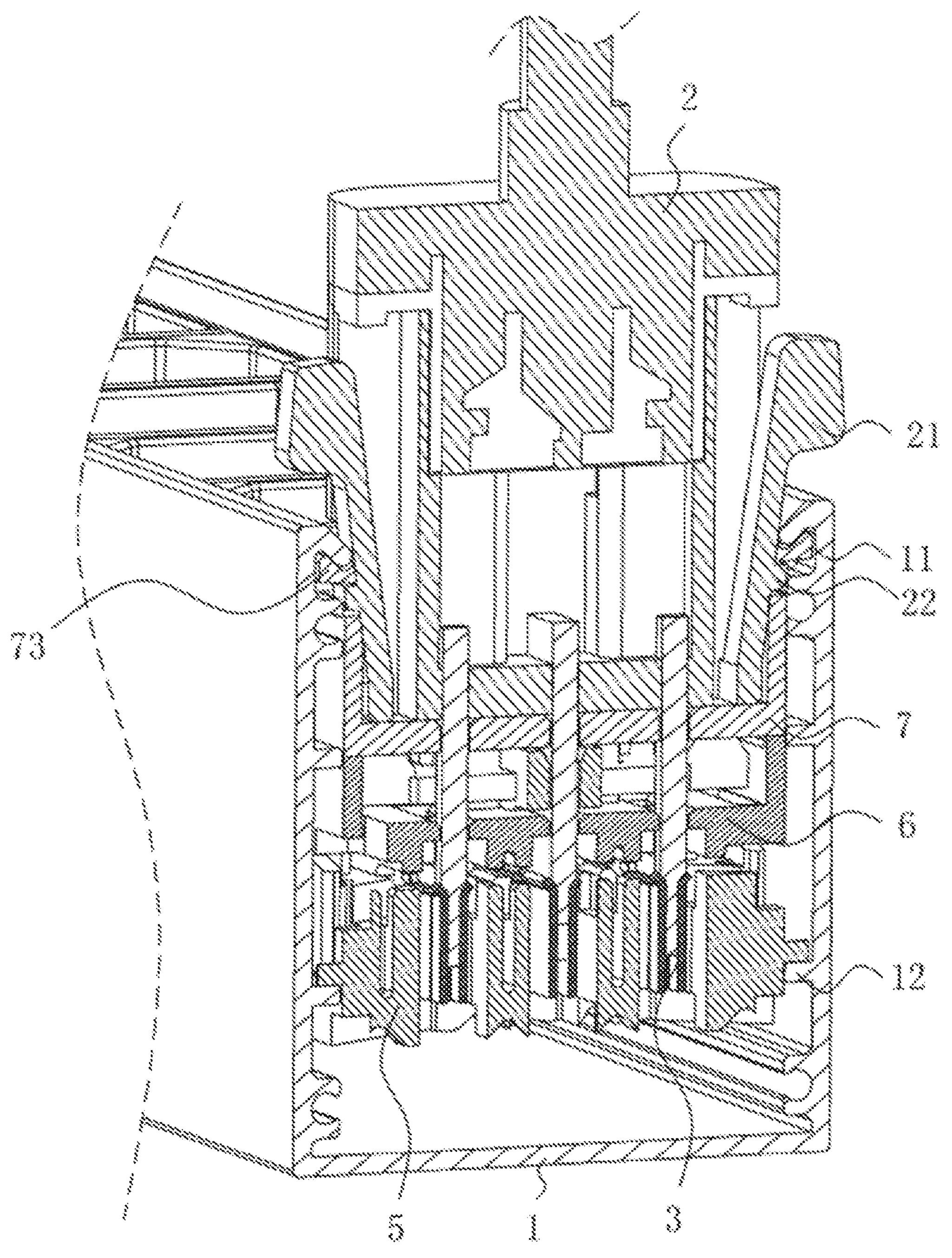
FIG. 2 is a schematic cross-sectional view of a housing perpendicular to its own length direction.
Figure 3:
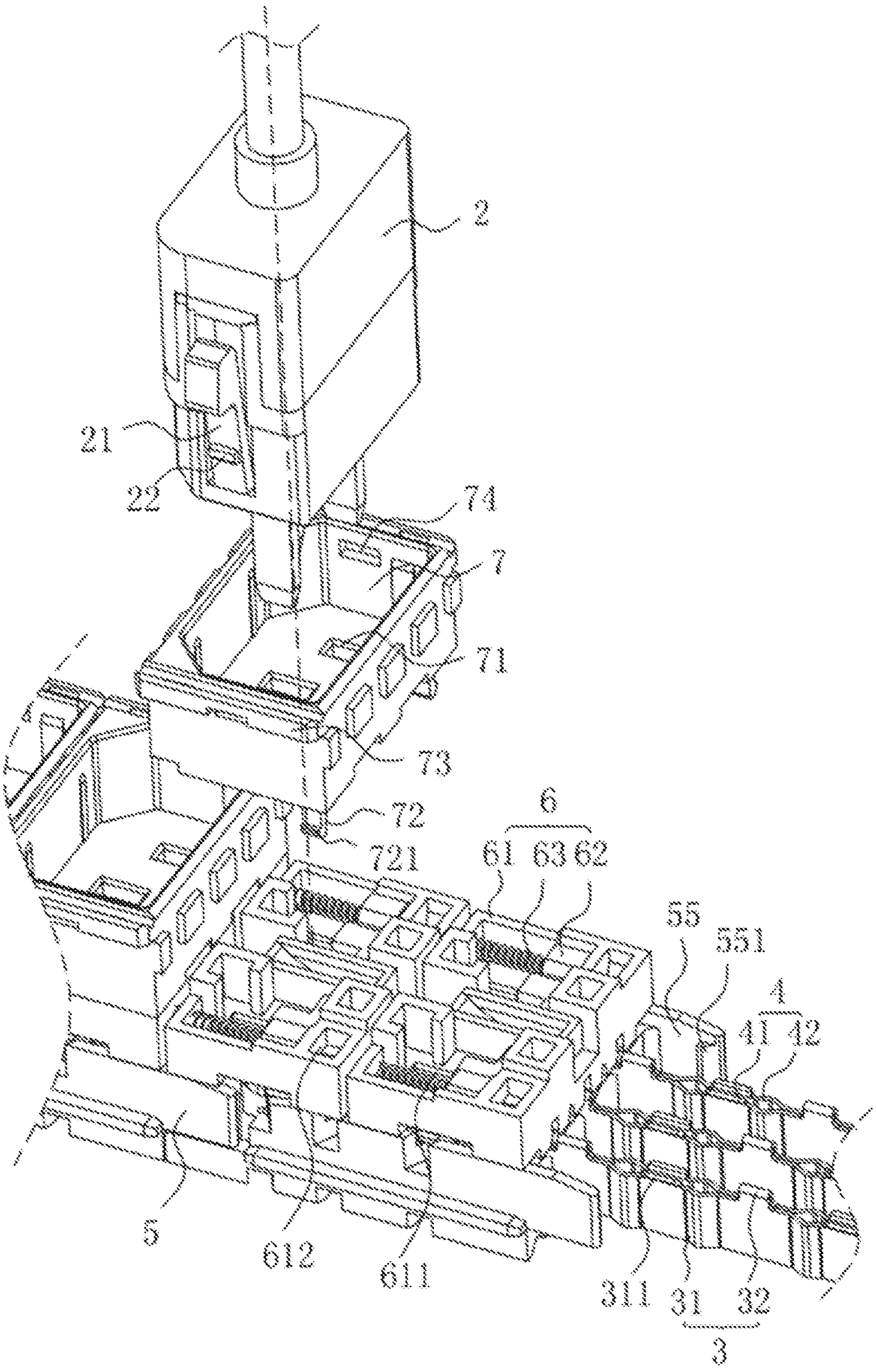
FIG. 3 is a schematic explosive structure view of a power adapter and pre-installed seat.

An embodiment of the present application discloses a PDU power distribution apparatus. Referring to FIGS. 1, 2 and 3, the PDU power distribution apparatus including a housing 1, the housing 1 is provided with a conductor assembly 3 facing its bottom, and a power adapter 2 is connected to the housing 1, a fixing element is provided between the conductor assembly 3 and the housing 1 for fixing the conductor assembly 3, and a protecting seat 6 is provided in the housing 1 for protecting the conductor assembly 3, the protecting seat 6 is located on a side of the conductor assembly 3 departing from the bottom of the housing 1, and the protecting seat 6 is provided with a through hole for inserting and connecting the power adapter 2, a pre-installed seat 7 is provided in the housing 1 for installing the power adapter 2, the pre-installed seat 7 is located on a side of the protecting seat 6 departing from the conductor assembly 3, the pre-installed seat 7 is in plug-in connection with the protecting seat 6 along an insertion direction of the power adapter 2. The pre-installed seat 7 blocks an exposed part of the conductor assembly 3, greatly reducing a possibility of items such as steel rulers and coins falling from a socket 71 into a through hole 611 and abutting against the conductor assembly 3, in addition, the protecting seat 6 protects the conductor assembly 3, so that a position of the through hole 611 will only open when the power adapter 2 is inserted into the through hole 611, thereby further improving a safety of using PDU.

Referring to FIG. 2, a guiding slot 11 is provided on an inner side of the housing 1 departing from its own bottom, two sides of the pre-installed seat 7 abutting against an inner wall of the housing 1 are fixedly connected with guiding strips 73 that are matched with the guiding slot 11, so that the pre-installed seat 7 slides and connects with the housing 1 along a length direction of the housing 1. The inner side of the housing 1 is fixedly connected to a supporting strip 12 facing its own bottom, and the fixing element departing from a surface of the pre-installed seat 7 abuts with the supporting strip 12.

Referring to FIG. 3, the conductor assembly 3 includes two copper strips 31 and a connecting part 32 that is connected between the two copper strips 31, the copper strip 31 is parallel to the insertion direction of the power adapter 2 which is configured to acquire power from the conductor assembly 3, and the two copper strips 31 abut against each other, the conductor assembly 3 is provided with an inserting part 4, the connecting part 32 and the inserting part 4 are provided at intervals, the inserting part 4 includes at least two elastic slots 41 and a snap-in hole 42, in the embodiment, the inserting part 4 includes two elastic slots 41 and one snap-in hole 42, the snap-in hole 42 is located between the two elastic slots 41, and two opposite copper strips 31 protrude departing from each other to form an elastic slot 41, at a position of the snap-in hole 42, the two copper strips 31 are parallel to each other, and a distance between the two copper strips 31 is less than a maximum distance between the two copper strips 31 at a position of the elastic slot 41.

A guiding part 311 is fixedly connected to the copper strip 31 facing a side of the power adapter 2, the guiding part 311 is fixedly connected to a position of the socket 71 of the copper strip 31, along a direction facing the power adapter 2, a distance between opposite guiding parts 311 on a same copper strip 31 gradually increases, a plug part of the power adapter 2 is prone to insert between the two guiding parts 311, and then as the power adapter 2 gradually inserts, the guiding part 311 gradually guides the plug part of the power adapter 2 into the socket 71, the guiding part 311 can guide the plug part of the power adapter 2, so that the power adapter 2 is prone to be inserted into the conductor assembly 3 for power acquisition. A providing of the conductor assembly 3, a larger contact area between the copper strip 31 and the plug part of the power adapter 2, reducing a temperature rise at a contact position, at the same time, the distance between the two copper strips 31 at the snap-in hole 42 can be smaller, the plug part of the power adapter 2 is only a metal sheet, which is conducive to further reducing a size of the socket 71 and the through hole 611, thereby making it difficult for the coins and other items to fall into the PDU and improving safety.

Referring to FIGS. 3, 4, 6 and 7, the fixing element includes a plurality of fixed strips 5 that are sequentially inserted along a length direction of the conductor assembly 3, a mounting slot 51 is provided on a side of the fixed strip 5 facing the protecting seat 6, and the mounting slot 51 is matched with the conductor assembly 3, a surface of a seat body 61 facing the conductor assembly 3 is provided with a mounting snap-in slot 615 for clamping the conductor assembly 3, the conductor assembly 3 is clamped between the mounting slot 51 and the mounting snap-in slot 615; a positioning rod 52 is fixedly connected to an end of the fixed strip 5 along the length direction of the conductor assembly 3, and a positioning slot that is matched with the positioning rod 52 is defined at another end of the fixed strip 5 along the length direction of the conductor assembly 3; a connecting block 55 is fixedly connected to the end of the fixed strip 5 along the length direction of the conductor assembly 3, and the connecting block 55 is located on both sides of the fixed strip 5 departing from its center, a convex block 551 is fixedly connected to a side of the connecting block 55 facing the center of the fixed strip 5, and another end of the fixed strip 5 is provided with a connecting slot 53 that is matched with the convex block 551, matching of the connecting block 55, the convex block 551, and the connecting slot 53 stably clamps the adjacent two fixed strips 5 together. The fixing element is fixedly connected to a positioning column 54 on a side facing the pre-installed seat 7, a stable slot 614 is provided on a surface of the seat body 61 facing the conductor assembly 3 that is matched with the positioning column 54, ensuring a stability of a position between the fixed strip 5 and the protecting seat 6.

Referring to FIGS. 3, 5, 6 and 7, the mounting slot 51 includes a fixing slot 511 and an accommodating slot 512, the fixing slot 511 and the accommodating slot 512 are sequentially connected, and the fixing slot 511 extends to directions departing from a middle part of itself, when it approaches ends of itself, a width of the fixing slot 511 gradually decreases, while a width of the accommodating slot 512 is uniform, a slot width of the accommodating slot 512 is consistent with a width of an end of the fixing slot 511, and the inserting part 4 is just clamped in the fixing slot 511, the conductor assembly 3 is located exactly in the accommodating slot 512 where the copper strips 31 abut against each other, the two ends of the fixing slot 511 can have a large contact area with the copper strip 31 at the position of the elastic slot 41, so that the fixing slot 511 can have a good fixing effect on the inserting part 4, the conductor assembly 3 and the fixing element will not move along the length direction of the conductor assembly 3, the accommodating slot 512 penetrates through the fixing element along the insertion direction of the power adapter 2, thus, the conductor assembly 3 can achieve good heat dissipation at a position of the accommodating slot 512; a slot width at both ends of the mounting snap-in slot 615 is smaller than the slot width in the middle part of itself, so that the inserting part 4 can be located in a middle of the mounting snap-in slot 615, the position where the copper strips 31 of the conductor assembly 3 abut against each other can be stably clamped by the mounting snap-in slot 615, ensuring a stability of the copper strip 31 being fixed; the mounting slot 51 and the mounting snap-in slot 615 complete insulation of the conductor assembly 3 and positioning of the snap-in hole 42 together.

Figure 4:
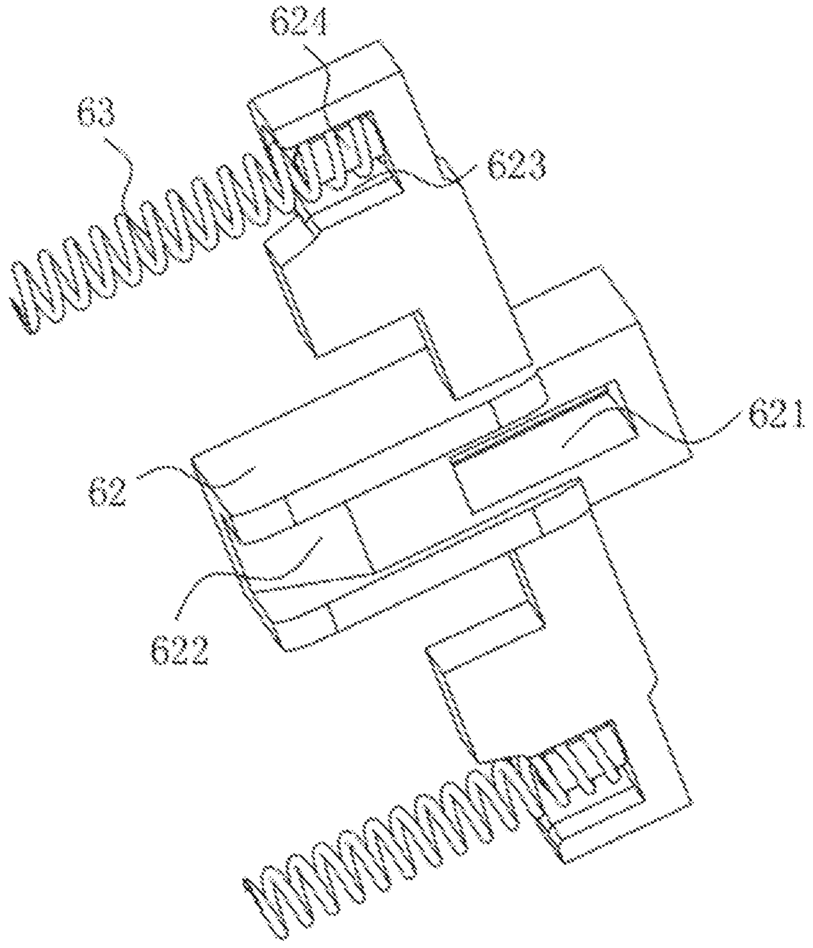
FIG. 4 is a schematic structure view of a protecting seat after concealing a seat body.

Referring to FIGS. 3 and 4, the protecting seat 6 includes a seat body 61, a stopper 62, and a protecting spring 63, the stopper 62 is located on a side of the seat body 61 departing from the conductor assembly 3, the through hole 611 is defined on the seat body 61 for inserting and connecting the power adapter 2, the protecting spring 63 is connected between the stopper 62 and the seat body 61, a deformation direction of the protecting spring 63 is parallel to the length direction of the housing 1, the stopper 62 is provided with an opening hole 621, which is directly facing the through hole 611, the stopper 62 is fixedly connected with an inclined block 622, the inclined block 622 is located at an end facing the protecting spring 63 in the opening hole 621, a surface of the inclined block 622 departing from the conductor assembly 3 gradually approaches the conductor assembly 3 along a direction departing from the protecting spring 63, when the protecting spring 63 is in a natural state, the stopper 62 and the inclined block 622 just block the through hole 611. A sliding strip is fixedly connected to a surface of the seat body 61 departing from the conductor assembly 3, a length direction of the sliding strip is parallel to the conductor assembly 3, the sliding strip is facing the opening hole 621, and the sliding strip is located on a side of the seat body 61 which is connected to the protecting spring 63, a bottom of the stopper 62 is provided with a through slot that penetrates through along the length direction of the conductor assembly 3, and the sliding strip is located in the through slot. When the power adapter 2 is plugged from the socket 71 to the protecting seat 6, the power adapter 2 first abuts against the inclined block 622, as the power adapter 2 is inserted, the inclined block 622 is pushed by the power adapter 2 and moves along the length direction of the sliding strip, the inclined block 622 drives the stopper 62 to move, and the stopper 62 gradually compresses the protecting spring 63, so that the stopper 62 and the inclined block 622 gradually open the through hole 611, when the power adapter 2 is pulled out, the protecting spring 63 drives the stopper 62 to continue blocking the through hole 611.

Referring to FIGS. 3 and 4, a limiting slot 623 is provided on a side of the stopper 62 facing the protecting spring 63, and the stopper 62 is fixedly connected to a limiting column 624, the limiting column 624 is located at a bottom of the limiting slot 623, and a length direction of the limiting column 624 is parallel to the deformation direction of the protecting spring 63, an end of the protecting spring 63 is located inside the limiting slot 623 and is sleeved on the limiting column 624. The limiting slot 623 increases a length of the protecting spring 63 between the seat body 61 and the stopper 62, reducing a deformation of the protecting spring 63 per unit length, thereby improving a service life of the protecting spring 63, at the same time, the limiting column 624 limits the protecting spring 63, ensuring a stability of its position.

Figure 5:
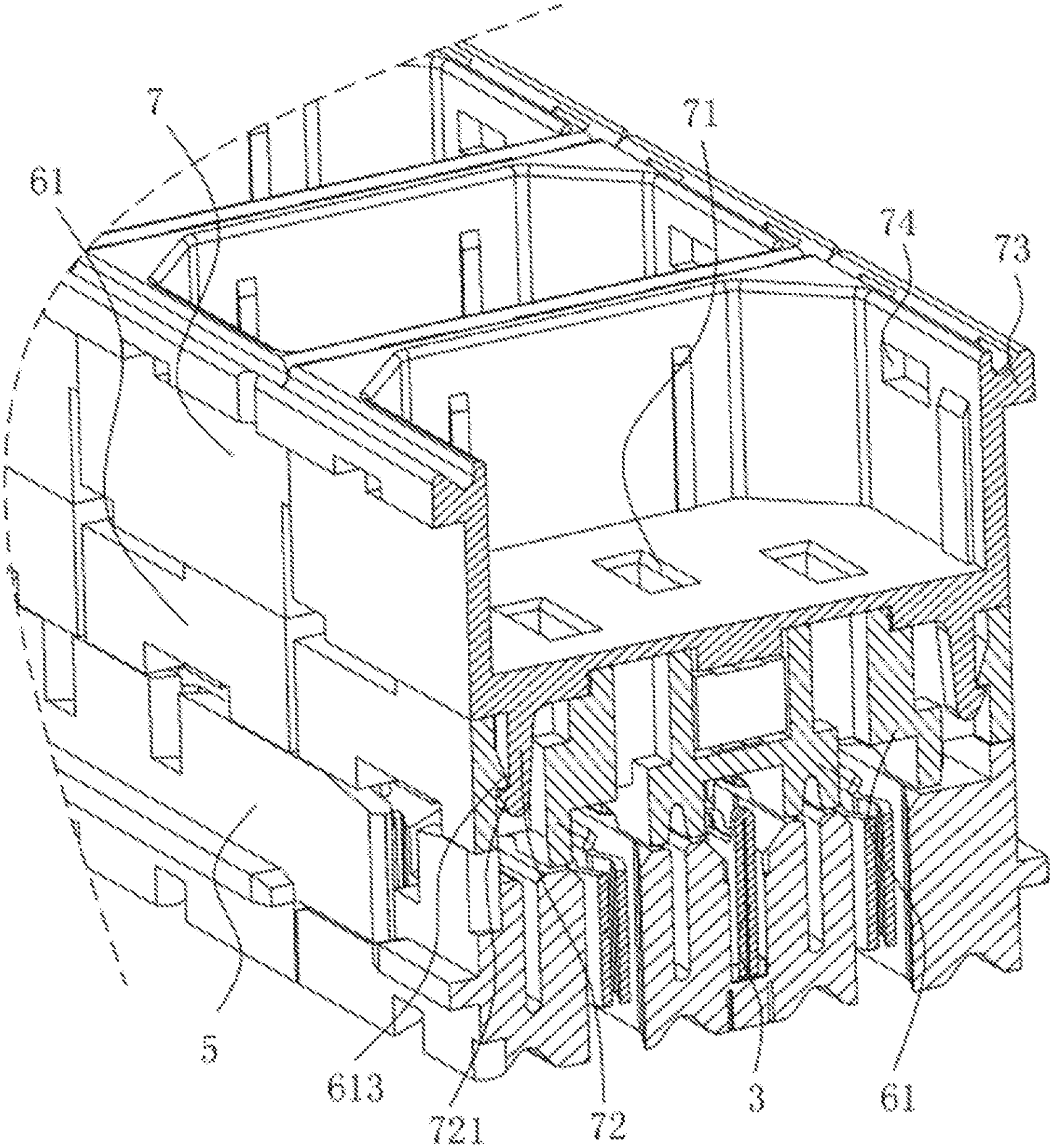
FIG. 5 is a schematic cross-sectional view of the pre-installed seat at a position of a snap-fit block.
Figure 6:
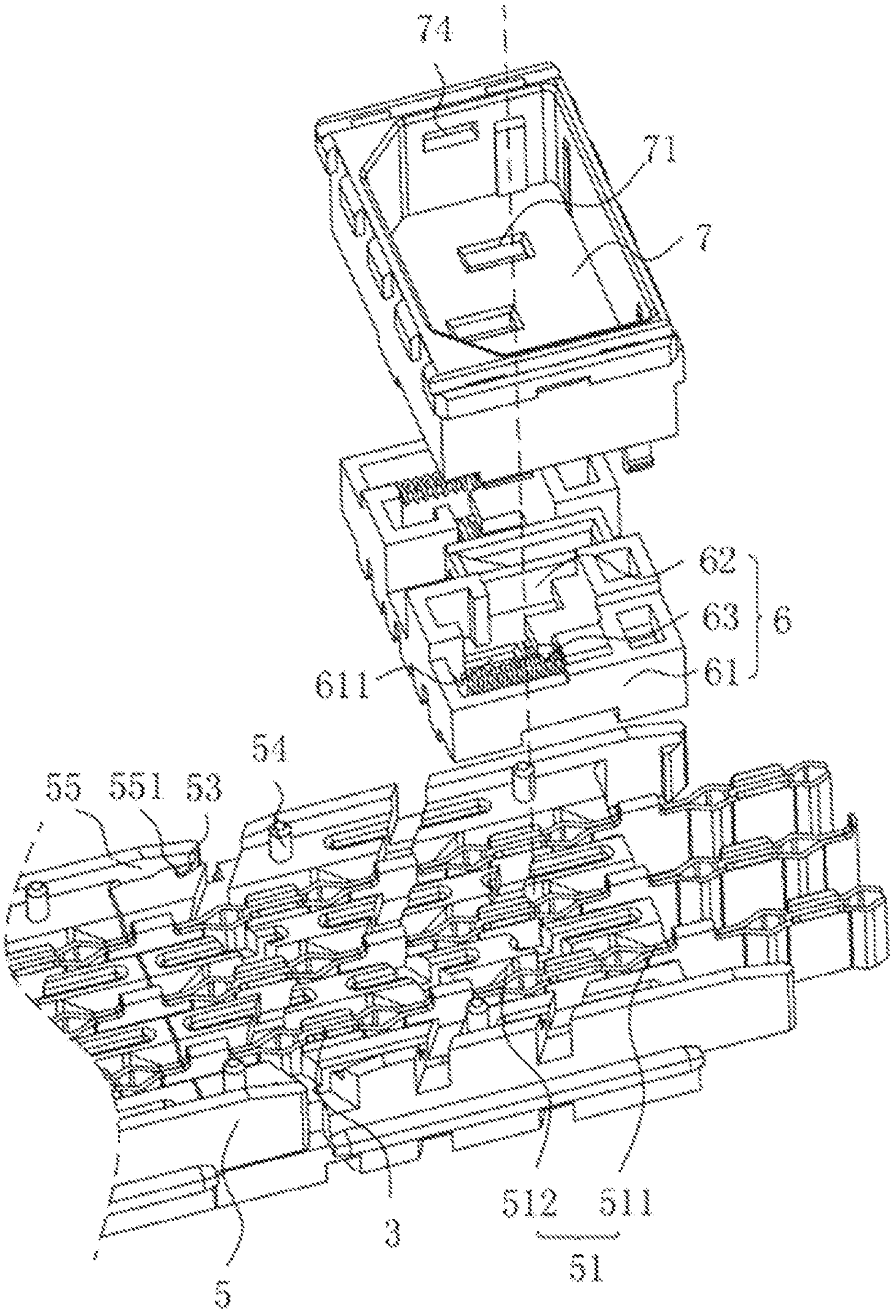
FIG. 6 is a schematic structure view intended to show a connection relationship between fixed strips.
Figure 7:
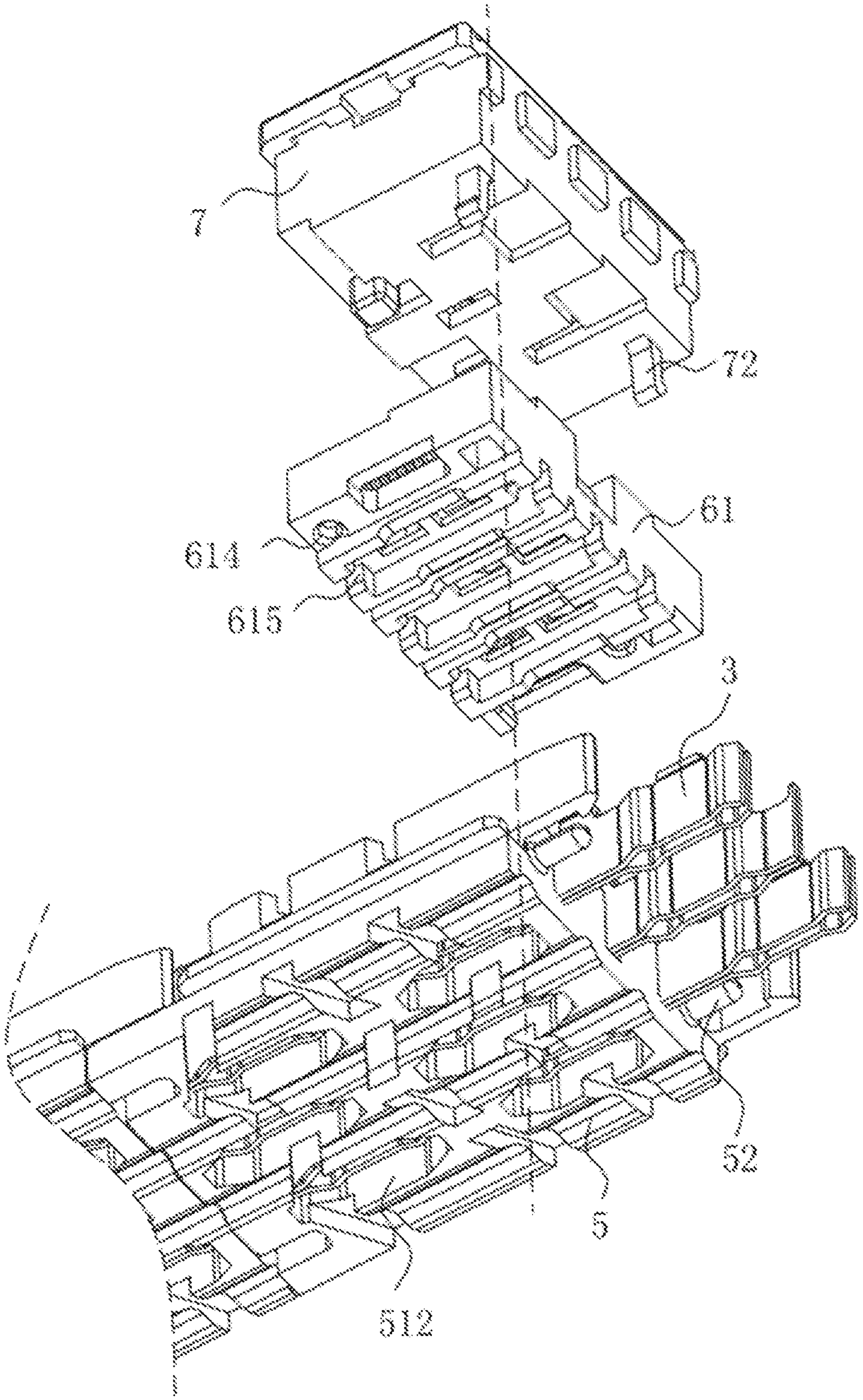
FIG. 7 is a schematic structure view intended to show a structure of an accommodating slot.

Referring to FIGS. 3, 5 and 7, a snap-in slot 612 is provided on the side of the seat body 61 departing from the conductor assembly 3, and a snap-fit column 72 that is matched with the snap-in slot 612 is fixedly connected to a side of the pre-installed seat 7 facing the conductor assembly 3, an inner wall of the seat body 61 is fixedly connected to a guiding block 613, which starts from an inner wall of the snap-in slot 612 and gradually approaches a center of the snap-in slot 612 towards the conductor assembly 3, the snap-fit column 72 is fixedly connected to a snap-fit block 721 on a side facing the guiding block 613, the snap-fit block 721 starts from a bottom of the snap-fit column 72 and gradually moves away from the conductor assembly 3 in a direction departing from the snap-fit column 72, an end of the snap-fit block 721 departing from the conductor assembly 3 abuts against an end of the guiding block 613 facing the conductor assembly 3, along a direction perpendicular to a length of the conductor assembly 3 and a direction perpendicular to an insertion of the power adapter 2, fixing holes 74 are defined on both sides of the pre-installed seat 7, two sides opposite to the fixing holes 74 of the power adapter 2 are connected with snap-fit parts 21, the snap-fit part 21 starts from a side of the power adapter 2 facing a position of the conductor assembly 3 and gradually moves away from the power adapter 2 in a direction departing from an arrangement, a fixed block 22 is fixedly connected to a side of the snap-fit part 21 departing from the power adapter 2, and the fixed block 22 is matched with the fixing hole 74. Allowing a relative position between the protecting seat 6 and the pre-installed seat 7 more stable, and allowing an alignment of the through hole 611 and the socket 71 more stable and accurate.

An implementation principle of the PDU power distribution apparatus in the embodiment of the present application is: sequentially connecting the fixed strips 5 together, so that the positioning column 54 which is connected to the fixed strip 5 is inserted into the stable slot 614, completing a connection of the fixed strip 5. Then, clamping the conductor assembly 3 into the mounting slot 51, and placing the conductor assembly 3 in the accommodating slot 512 at the position where the copper strips 31 abut against each other, the inserting part 4 is located in the fixing slot 511, then, installing the protecting seat 6 on the side of the conductor assembly 3 departing from the fixed strip 5, so that the conductor assembly 3 clamps to fix the snap-in slot 612, the positioning column 54 is clamped in the stable slot 614, the seat body 61 and the fixing slot 511 are installed.

Inserting the fixed strip 5, the conductor assembly 3, the protecting seat 6, and the pre-installed seat 7 into the housing 1 as a whole, and clamping the guiding strip 73 into the guiding slot 11, the fixed strip 5 abuts against a side of the supporting strip 12 departing from the bottom of the housing 1, and then closing an end of the housing 1 to complete an installation.

When in use, the power adapter 2 is plugged into the socket 71, as the power adapter 2 is inserted, the power adapter 2 first abuts against the inclined block 622, as the power adapter 2 is inserted, the inclined block 622 is pushed by the power adapter 2 and drives the stopper 62 to move, the stopper 62 gradually compresses the protecting spring 63, so that the stopper 62 and the inclined block 622 gradually open the through hole 611, allowing the plug part of the power adapter 2 to be inserted into the through hole 611, when the power adapter 2 is pulled out, the protecting spring 63 drives the stopper 62 to continue blocking the through hole 611. The protecting seat 6 protects the conductor assembly 3, so that the through hole 611 of the protecting seat 6 will only open when the power adapter 2 is inserted into the protecting seat 6, improving the safety of using PDU, and the power adapter 2 is limited to prevent it from tipping over, allowing the power adapter 2 to be stably inserted into the pre-installed seat 7.

The above are the preferred embodiments of the present application, which are not intended to limit the protection scope of the present application. Therefore, all equivalent changes made according to the structure, shape and principle of the present application should be covered within the protection scope of the present application.

What is claimed is:

1. A Power Distribution Unit (PDU) power distribution apparatus, comprising: a housing, wherein a conductor assembly is provided close to a bottom of the housing, a fixing element is provided between the conductor assembly and the housing for fixing the conductor assembly, a protecting seat is provided inside the housing for protecting the conductor assembly, the protecting seat is provided with a through hole for inserting a power adapter, a pre-installed seat is provided inside the housing for installing the power adapter, the pre-installed seat is located on a side of the protecting seat departing from the conductor assembly, a socket is provided on a side of the pre-installed seat facing the conductor assembly for plugging the power adapter, and the pre-installed seat is connected to the housing.

2. The PDU power distribution apparatus according to claim 1, wherein, the protecting seat is in plug-in connection with the fixing element along an insertion direction of the power adapter, and the protecting seat is in plug-in connection with the pre-installed seat along the insertion direction of the power adapter.

3. The PDU power distribution apparatus according to claim 1, wherein, the protecting seat comprises a seat body, a stopper, and a protecting spring, the stopper is located on a side of the seat body departing from the conductor assembly, a second through hole is provided on the seat body, the protecting spring is connected between the stopper and the seat body, a deformation direction of the protecting spring is parallel to a length direction of the housing, the stopper is provided with an opening hole directly facing the second through hole, the stopper is fixedly connected to an inclined block, the inclined block is located at an end of the opening hole close to the protecting spring, a surface of the inclined block departing from the conductor assembly gradually approaches the conductor assembly along a direction departing from the protecting spring, and when the protecting spring is in a natural state, the stopper and the inclined block block the second through hole.

4. The PDU power distribution apparatus according to claim 3, wherein, a limiting slot is provided on a side of the stopper facing the protecting spring, the stopper is fixedly connected to a limiting column, the limiting column is located at a bottom of the limiting slot, a length direction of the limiting column is parallel to the deformation direction of the protecting spring, an end of the protecting spring is located inside the limiting slot, and the protecting spring is sleeved on the limiting column.

5. The PDU power distribution apparatus according to claim 3, wherein, a snap-in slot is provided on the side of the seat body departing from the conductor assembly, a snap-fit column matched with the snap-in slot is fixedly connected to the side of the pre-installed seat facing the conductor assembly, an inner wall of the seat body is fixedly connected to a guiding block, the guiding block starts from an inner wall of the snap-in slot and gradually approaches a center of the snap-in slot towards the conductor assembly, a side of the snap-fit column opposite to the guiding block is fixedly connected with a snap-fit block, the snap-fit block starts from a bottom of the snap-fit column and gradually departs away from the conductor assembly in a direction departing from the snap-fit column, and an end of the snap-fit block departing from the conductor assembly abuts against an end of the guiding block close to the conductor assembly.

6. The PDU power distribution apparatus according to claim 1, wherein, the conductor assembly comprises two copper strips and a connecting part that is connected between the two copper strips, the two copper strips are parallel to an insertion direction of the power adapter, the power adapter is configured to acquire power from the conductor assembly, the two copper strips abut against each other, the conductor assembly is provided with an inserting part, the connecting part and the inserting part are arranged at intervals, the inserting part comprises at least two elastic slots and a snap-in hole, the snap-in hole is located between two elastic slots of the at least two elastic slots, at the at least two elastic slots, the two copper strips protrude departing from each other, and a distance between the two copper strips at the snap-in hole is less than a maximum distance between the two copper strips at the at least two elastic slots.

7. The PDU power distribution apparatus according to claim 1, wherein, a mounting slot matched with the conductor assembly is provided on a side of the fixing element facing the protecting seat, the mounting slot comprises a fixing slot and an accommodating slot, the fixing slot and the accommodating slot are sequentially connected, the fixing slot expands from a middle part of the fixing slot, a width of the fixing slot is gradually reduced when approaching an end part of the fixing slot, and a width of the accommodating slot is uniform and is equal to a width of an end of the fixing slot.

8. The PDU power distribution apparatus according to claim 7, wherein, the fixing element is fixedly connected to a positioning column on a side facing the pre-installed seat, and a stable slot matched with the positioning column is provided on a surface of a seat body of the protecting seat facing the conductor assembly.

9. The PDU power distribution apparatus according to claim 7, wherein, the accommodating slot penetrates through the fixing element along an insertion direction of the power adapter.

10. The PDU power distribution apparatus according to claim 7, wherein, the fixing element comprises a plurality of fixed strips that are sequentially inserted along a length direction of the conductor assembly, a first end of each of the plurality of fixed strips is fixedly connected to a connecting block along the length direction of the conductor assembly, the connecting block is located on both sides of each of the plurality of fixed strips departing from a center of each of the plurality of fixed strips, a side of the connecting block facing the center of each of the plurality of fixed strips is fixedly connected to a convex block, and a second end of each of the plurality of fixed strips is provided with a connecting slot that is matched with the convex block.

* * * * *